United States Patent [19]

Pryor

[11] 4,213,069
[45] Jul. 15, 1980

[54] ELECTRIC MOTOR

[76] Inventor: Leroy W. Pryor, Box 596, Ladd, Ill. 61329

[21] Appl. No.: 894,922

[22] Filed: Apr. 10, 1978

[51] Int. Cl.$^2$ ............................................. H02K 7/00
[52] U.S. Cl. .................................. 310/46; 310/68 R; 310/154
[58] Field of Search .................. 310/46, 49, 72, 68 D, 310/152, 162-165, 170-195; 318/701

[56] References Cited

U.S. PATENT DOCUMENTS

| | | | |
|---|---|---|---|
| 1,199,652 | 9/1916 | Aron et al. | 310/46 |
| 1,996,023 | 3/1935 | MacLachlan | 310/46 |
| 2,070,790 | 2/1937 | Hammes | 310/46 |
| 2,093,369 | 9/1937 | Rypinski | 310/46 |
| 2,669,687 | 2/1954 | DeTastes | 310/41 X |
| 2,968,755 | 1/1961 | Baermann | 310/46 X |
| 2,999,952 | 9/1961 | Hammes | 310/154 |
| 3,064,150 | 11/1962 | Barnes | 310/46 X |
| 3,275,861 | 9/1966 | Goroszko | 310/46 |

*Primary Examiner*—Donovan F. Duggan
*Attorney, Agent, or Firm*—Price, Heneveld, Huizenga & Cooper

[57] ABSTRACT

An electric motor is disclosed having stator and magnetic field gradients that taper from strong to weak. The stator is divided into north and south pole sections which each define half of a cylindrical cavity for axially receiving the rotor. The stator magnetic field gradient is established by north and south pole stator sections each having an axial cross section defined by first and second overlapping circles. The first circle is centered on the axial centerline of the motor. The second circle is centered on the vertical centerline of the motor and is provided with a radius approximately equal to the diameter of the first circle. The first and second circles intersect at a common tangent to define the weakest of the north and south pole sections of the stator. A tangent of the first circle spaced 180° from the common tangent of the first and second circles intersects the second circle to define the strongest of the north and south pole sections of the stator. The rotor is shunt wound and is connected to a resistance network by commutator and brushes for establishing a rotor magnetic field gradient. Commutator action maintains the strongest and weakest north and south pole seeking sections of the rotor windings adjacent the strongest and weakest north and south pole sections of the stator magnetic field, respectively.

7 Claims, 10 Drawing Figures

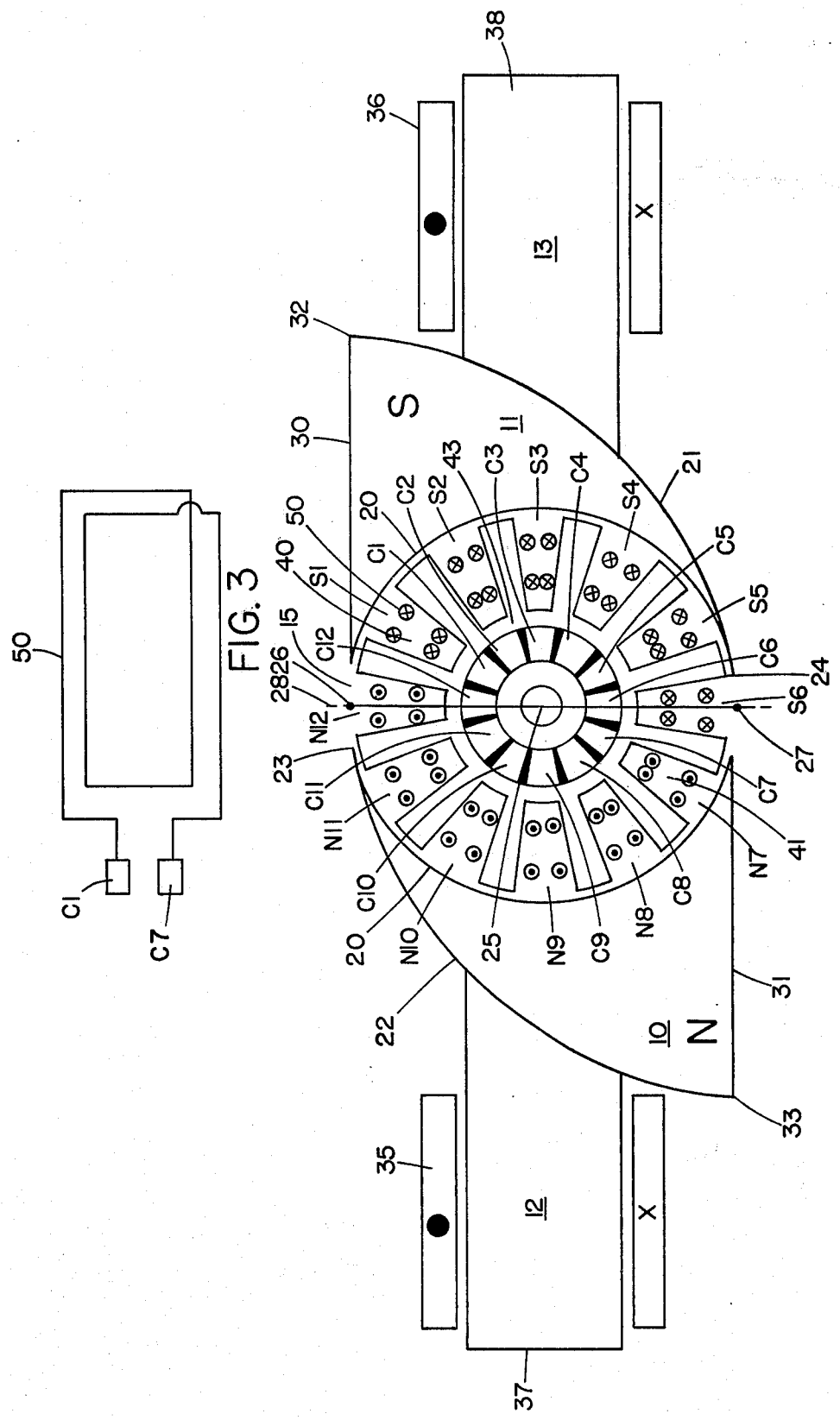

ELECTRIC MOTOR

BACKGROUND OF THE INVENTION

The invention relates generally to alternating current and direct current electric motors. More specifically, the invention is directed to an electric motor having improved efficiency.

Conventional electric motors include a stator and a rotor which cooperate to produce a torque on the rotor shaft when current is induced in the rotor windings. Torque is created when current is induced in the rotor windings since the rotor windings establish a plurality of magnetic north and south poles on the rotor which are attracted and repelled by south and north pole sections of the stator, respectively. In most cases, rotors are provided with distributed windings which are spread over a number of slots disposed about the periphery of the rotor. With distributive windings, the individual coils of the windings are interconnected to provide belts of conductors in the slots carrying oppositely directed currents parallel to the shaft and arranged to produce the same number of poles as the stator. In general, conventional electric motor designs provide stator and rotor magnetic poles of uniform and equal magnitude. As a result, in conventional electric motor designs, there are often particular angular orientations of the rotor where the rotor poles are not optimally disposed to create the greatest torque.

It is known that the shape of the core of an electromagnet, such as those used to establish the stator field of an electric motor, may be altered to generate a magnetic field gradient. The prior art also reveals examples of electric motors having current limiting devices, such as resistors, connected in series with rotor windings for the purpose of controlling speed, acceleration, and the load on an electric motor. Various devices for energizing or controlling a predetermined sequence of armature windings are also revealed in the prior art. However, the prior art has not considered the combination of these features in an effort to provide an electric motor having an improved disposition of attracting and repelling forces and thus an improved efficiency.

SUMMARY OF THE INVENTION

This and other objects of the invention are carried out by the present invention by providing an electric motor having stator and rotor magnetic field gradients that taper from strong to weak. The motor also includes means for maintaining the rotor and stator magnetic field gradients at an angular orientation at which their attracting and repelling forces are most efficiently disposed. The stator magnetic field gradient is created by providing a specific core structure for the electromagnets establishing the stator magnetic field. The core of the stator is divided into north and south pole sections, each defining half of a cylindrical cavity for axially receiving the rotor. These north and south pole stator sections each have an axial cross section defined by a minor segment of first and second overlapping circles having one common tangent. The first circle is centered on the axial centerline of the motor and the first circle presents a cylindrical cavity for axially receiving the rotor. The second circle is centered on the vertical centerline of the motor and is provided with a radius approximately equal to the diameter of the first circle. The first and second circles intersect at a common tangent to define the weakest north and south pole sections of the stator. A tangent of the first circle disposed 180° from the common tangent of the first and second circles intersects the second circle to define the strongest of the north and south pole sections of the stator.

The rotor magnetic field gradient is established by providing a cylindrical rotor including a plurality of opposing pairs of radially extending armature slots. A commutator is provided including a plurality of commutator segments, one commutator segment being associated with each armature slot. Pairs of commutator segments disposed on opposite sides of the commutator are associated with pairs of armature slots disposed on opposite sides of the rotor. Each of the paired armature slots are shunt wound by a conductor interconnecting opposing commutator sections.

The means for maintaining the rotor magnetic field gradient in the desired orientation with respect to the stator magnetic field gradient comprises a plurality of brushes, one brush being associated with each commutator segment. A plurality of resistor pairs are provided, members of the pairs having equal resistance values. The resistor pairs are associated with opposing pairs of brushes which contact opposing commutator sections. The resistor pairs progressively vary in resistance value from high to low and in this manner, individual rotor windings are connected in series with resistance of varying value to apportion current flow to the windings and thus establish a rotor magnetic field gradient. With rotor and stator magnetic field gradients so oriented, the strongest north and south pole seeking sections of the rotor windings are disposed adjacent the strongest north and south pole sections of the stator field thus insuring an optimum distribution of attracting and repelling forces.

BRIEF DESCRIPTION OF THE DRAWINGS

FIG. 2 is an end view of the commutator end of an electric motor constructed according to the present invention with the brush housing removed.

FIG. 3 is a schematic representation of an electrical winding and a pair of commutator segments of the electric motor of the present invention.

FIGS. 5A-7A illustrate the positions of the commutator and brushes for each of the rotor positions illustrated in FIGS. 5-7, respectively.

DESCRIPTION OF THE PREFERRED EMBODIMENT

Figure 1:
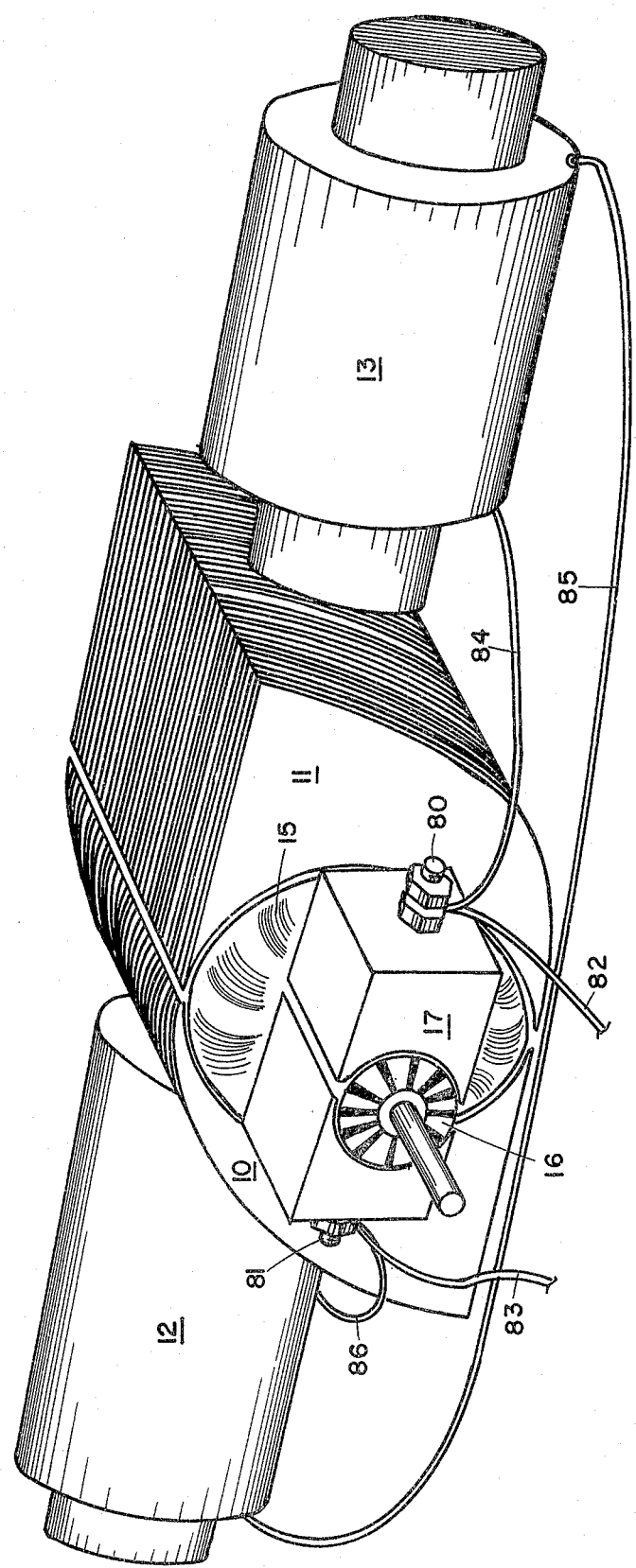
FIG. 1 is a perspective view of an electric motor constructed according to the present invention.

Referring to FIG. 1, a perspective view of an electric motor constructed according to the present invention is illustrated. The motor comprises north and south pole stator sections 10 and 11 for setting up a stator magnetic field gradient that tapers from strong to weak. In this case, the north and south pole sections of the stator comprise extended soft iron sections of the cores of north and south pole electromagnets 12 and 13, respectively. The north and south pole sections of the stator 10 and 11 are given a specific shape designed to produce the desired magnetic field gradient. The north and south pole sections of the stator 10 and 11, and the remainder of the cores of electromagnets 12 and 13 are laminated to reduce eddy current losses. The rotor generally indicated by the numeral 15 is disposed in a cylindrical cavity defined between north and south pole sections of the stator. The rotor 15 includes a plurality of armature windings each shunt wound between opposing armature slots. The rotor includes a commutator generally indicated by the numeral 16 which includes a plurality of opposing commutator segments. Opposing pairs of commutator segments are associated with each armature winding. Means for maintaining the rotor magnetic field gradient at the desired angular orientation with respect to the stator magnetic field gradient includes the commutator 16 and a brush assembly disposed at 17.

Referring now to FIG. 2, the structure of north south pole stator sections 10 and 11 and the rotor 15 are illustrated in further detail. The north and south pole sections of the stator each have axial cross sections defined by a minor segment of first and second overlapping circles. The south pole section of the stator 11 is defined by first and second overlapping circles 20 and 21. The north pole section of the stator 10 is defined by first and second overlapping circles 20 and 22. The first and second circles are centered differently, have different diameters, and intersect at common tangent points at 23 and 24 on the north and south pole sections of the stator, respectively. The first circle 20 is centered on the axial center line 25 of the motor. The second circles 21 and 22 of north and south pole sections of the stator have a radius approximately equal to the diameter of the first circle 20 and are centered at points 26 and 27 disposed 180° apart at the intersection of the circle 20 and the vertical center line 28 of the motor. The points 23 and 24 where the first and second circles intersect at a common tangent define the weakest north and south pole sections of the stator. The strongest north and south pole sections of the stator are disposed approximately 180° from the weakest north and south pole sections of the stator at points 23 and 24. The strongest north and south pole sections of the stator are defined by tangents 30 and 31 of the first circle 20 which intersect the second circles 21 and 22 at points 32 and 33, respectively. Electromagnets 12 and 13 are provided with windings 35 and 36 wound in an appropriate fashion on cylindrical cores 37 and 38 to generate the desired magnetic north and south pole forces in stator halves 10 and 11, respectively. Dots and crosses are used to schematically indicate the direction of current flow out and into the illustration at the point which the cross section is taken in the winding.

The rotor 15 comprises a generally cylindrical rotor body generally made from laminated soft iron including a plurality of opposing pairs of radially extending armature slots such as those illustrated at 40 and 41. The pairs of slots 40 and 41 are disposed 180° apart on opposite sides of the rotor 15. The rotor includes a commutator 43 having a plurality of commutator segments or sections C1 through C12 with opposing pairs of commutator segments such as C1 and C7 associated with opposing pairs of armature slots 40 and 41. Referring now briefly to FIG. 3, it is illustrated that the windings associated with opposing pairs of rotor slots 40 and 41 and opposing commutator segments C1 and C7 are shunt wound in a single direction around slots 40 and 41, interconnecting commutator segments C1 and C7. The rotor 15 includes a plurality of windings such as the winding 50 in slots 40 and 41 interconnecting commutator segments C1 and C7. In the present case, six pairs of slots and windings are provided to provide six north pole seeking rotor sections S1 through S6, and six south pole seeking rotor sections N7 through N12. The central axes of the windings are angularly spaced at an angle of approximately 30° about the periphery of rotor 15. The motor includes current limiting means associated with each of the windings and each pair of commutator segments such that a magnetic field gradient is established on the rotor 15. In the present case, current is apportioned between the six windings of rotor 15 such that the strongest south and north pole seeking sections of rotor 15 are sections N12 and S6, respectively. Sections N12 and S6 are disposed on opposite sides of the rotor 15 in the area adjacent the strongest south and north pole sections of the stator 11 and 10, respectively. Current is apportioned to the remaining windings such that south pole seeking sections N12 through N7 and north pole seeking sections S6 through S1 gradually taper in attractive strength from strong to weak. In this manner, the strongest and weakest north and south pole sections of the rotor and stator are disposed to obtain maximum torque from the attracting and repelling forces established by their respective magnetic field gradients.

Figure 4:
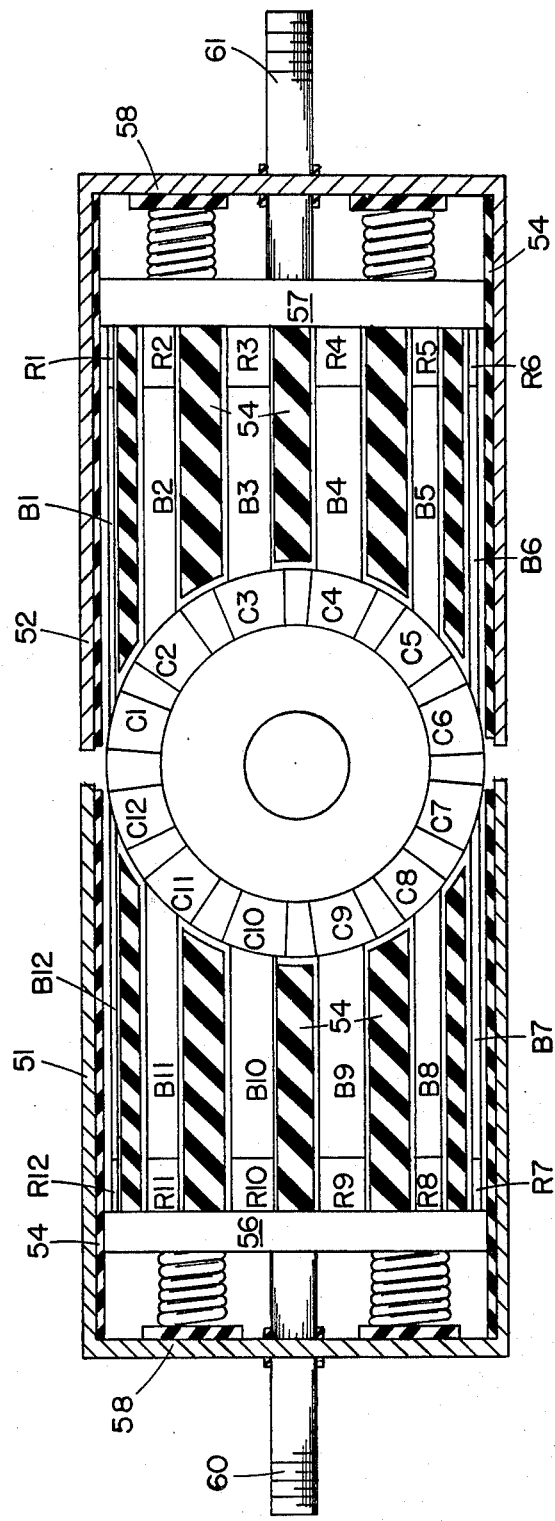
FIG. 4 is an end view partially in section of the commutator and brush assembly of an electric motor constructed according to the present invention.

Referring now to FIG. 4, the commutator and brushes provided to establish the rotor magnetic field gradient and maintain its orientation with respect to the stator magnetic field gradient are illustrated in further detail. Commutator segments C1 through C12 are surrounded by a rectangular brush housing. The rectangular brush housing is comprised of housing halves 51 and 52. Each of the housing halves 51 and 52 includes six brushes such as the brushes B1 through B6 associated with housing half 52 and the brushes B7 through B12 associated with the housing half 51. Each of the brushes B1 through B12 is separated and insulated from adjacent brushes and the brush housing 50 by electrical insulation generally indicated by the numeral 54. The brushes B1 through B12 are each disposed in the brush housing 50 such that they individually contact commutator segments C1 through C12. Resistors R1 through R12 are associated with brushes B1 through B12, respectively, and are in electrical contact therewith. Brush plates 56 and 57 are urged into electrical contact with resistors R1 through R12 by springs 58 compressed between the brush plates and the brush housing. The springs 58 and brush plate 56 serve to urge brushes B1 through B12, which are slidably received in brush housing 50, into electrical contact with commutator segments C1 through C12. Terminals 60 and 61 associated with brush plates 56 and 57, respectively, supply power to the brush and commutator assembly. Resistors R1 through R12 are arranged in pairs of resistors which are electrically connected to brush pairs contacting opposing sides of the commutator such as resistors R6 and R12. The opposing resistor pairs are equal in resistive value and the pairs of resistors progressively vary in resistance value from high to low. The strongest resistance pair is R1 and R7, and the weakest resistance pair is R6 and R12. In this manner, resistances of varying value are connected in series with the windings of the rotor to apportion current therebetween and produce a tapering magnetic field gradient which cooperates with the magnet field gradient of the stator.

Since the use of a resistance network to apportion current between windings of the rotor dissipates some energy in the form of heat, in other embodiments of the invention, the resistance network may be replaced with current limiting circuits which do not dissipate energy in the form of heat. However, it is to be noted that even though in the present embodiment a simple resistance network is used to apportion current between the windings of the rotor, the resistors are arranged in a parallel network which actually apportions current to the various windings and thus very little power is actually lost through heat dissipation in each resistor. It should also be recognized that although in the present embodiment a rectangular brush housing is employed to simplify construction, in other embodiments of the invention a plurality of radially extending brush housings may be provided, each housing containing at least one of the brushes B1 through B12.

Figure 5:
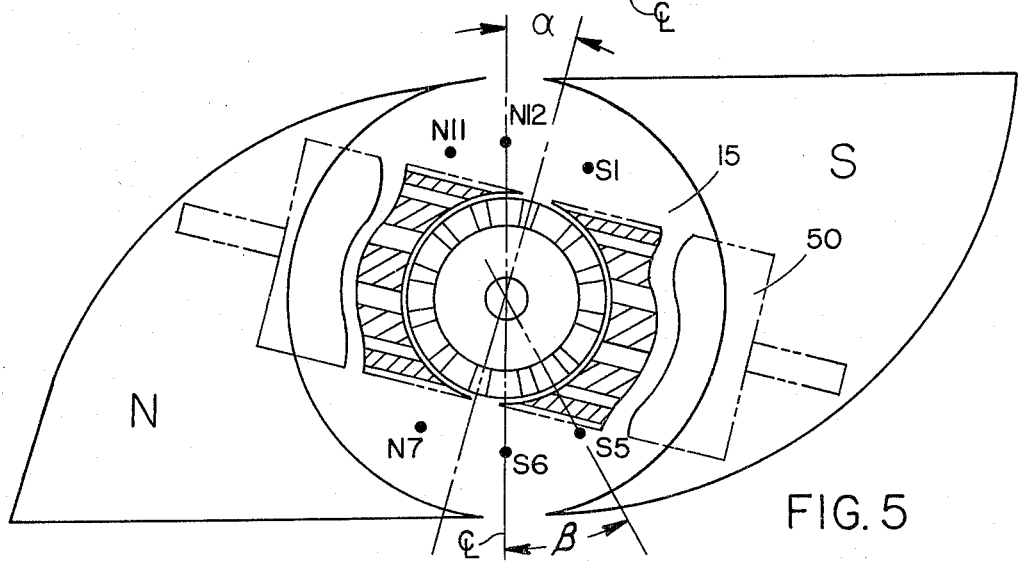
Figure 5A:
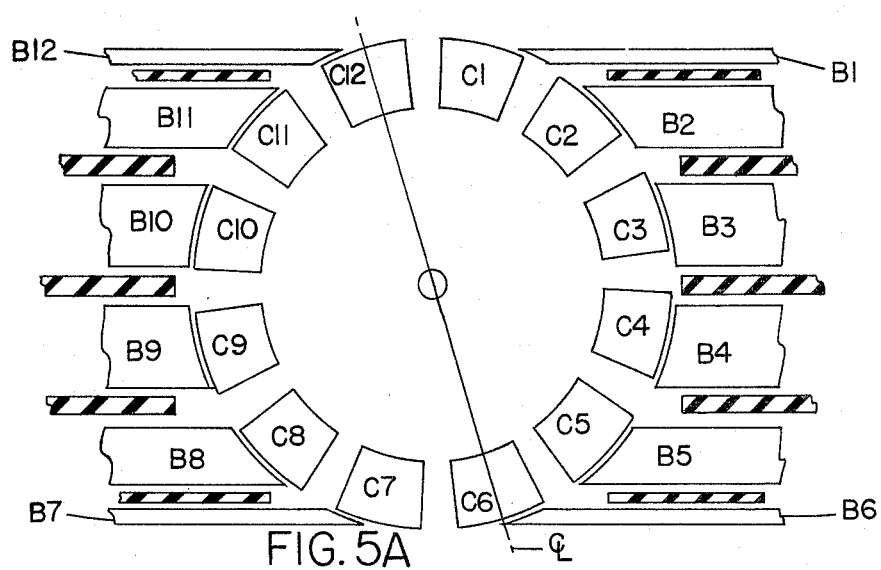

Referring to FIGS. 5 through 7 and 5A through 7A, the operation of the electric motor of the present invention will be explained in further detail. Referring now specifically to FIGS. 5 and 5A, south pole seeking sections N7, N11, and N12 and north pole seeking sections S1, S5, and S6 of rotor 15 are illustrated in the angular orientation of the rotor and commutator depicted in FIGS. 2 and 4. At this angular orientation, the commutator segments C1 through C12 each align with respective brush sections B1 through B12. In this case the angle $\beta$ representing the angular spacing of the windings or poles of the rotor 15 is 30°. The angle $\alpha$ is generally equal to approximately half of the angle $\beta$ or in this case approximately 15°. The vertical centerline or axis of symmetry 70 of the brush housing 50 is normally canted from the vertical by half of the angle $\beta$ or approximately 15°. The brush housing is so oriented to place the strongest south and north pole seeking sections N12 and S6 on the vertical centerline of the motor adjacent the strongest south and north pole sections of the stator, respectively. Moving counter-clockwise from south pole seeking section N12, the remaining south seeking sections of the rotor N11 through N7 gradually weaken, the weakest south seeking section N7 being disposed immediately adjacent the strongest north pole section of the stator. Moving clockwise from the strongest south pole seeking section of the rotor N12 the north pole seeking sections of the rotor S1 through S6 are disposed, S1 being the weakest north pole seeking section and S6 being the strongest north pole seeking section. The weaker north pole seeking sections starting with S1 are disposed adjacent the strongest south pole sections of the stator and the strongest north pole seeking section S6 is disposed adjacent the strongest north pole section of the stator. With rotor and stator magnetic field gradients so disposed, attracting and repelling magnetic forces cause the rotor 15 to rotate clockwise, generating a torque on shaft 71.

Figure 6A:
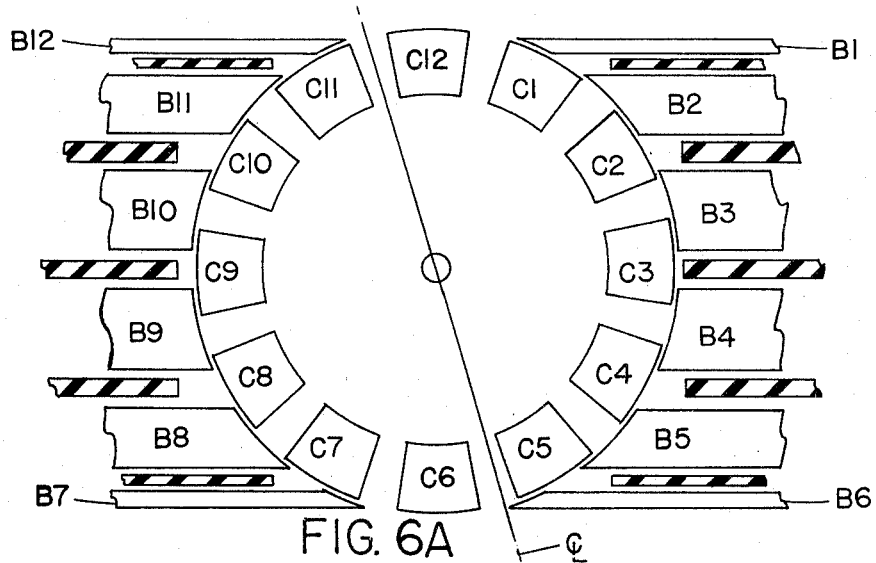

In FIGS. 5 and 5A, each of the brushes B1 through B12 is perfectly aligned with commutator sections C1 through C12, respectively. However, referring now to FIGS. 6 and 6A, as the rotor and commutator rotate clockwise a distance equal to the angle $\alpha$ the brushes B2 through B5 and B8 through B11, will come into contact with two commutator sections and brushes B1, B6, B7 and B12 will come in contact with only one section of the commutator. This will leave commutator sections C12 and C6, centered on the axis of symmetry 70 of brush housing 50, electrically isolated from the brushes. At this point, rotor sections N12 and S6, now disposed at an angle $\alpha$ with respect to the vertical center line of the motor, will have no current flow and rotor sections N11 and S5 will become the strongest south and north pole seeking sections of the rotor, respectively. Sections N11, and S5 become the strongest south and north pole seeking sections because the windings associated with these poles are in electrical contact with the weakest resistances R6 and R12. Moving counter-clockwise and clockwise from the vertical center line of the motor, south and north pole seeking sections of the rotor will weaken and strengthen in pairs as their windings are now in electrical contact with resistances of progressively increasing value.

Figure 7:
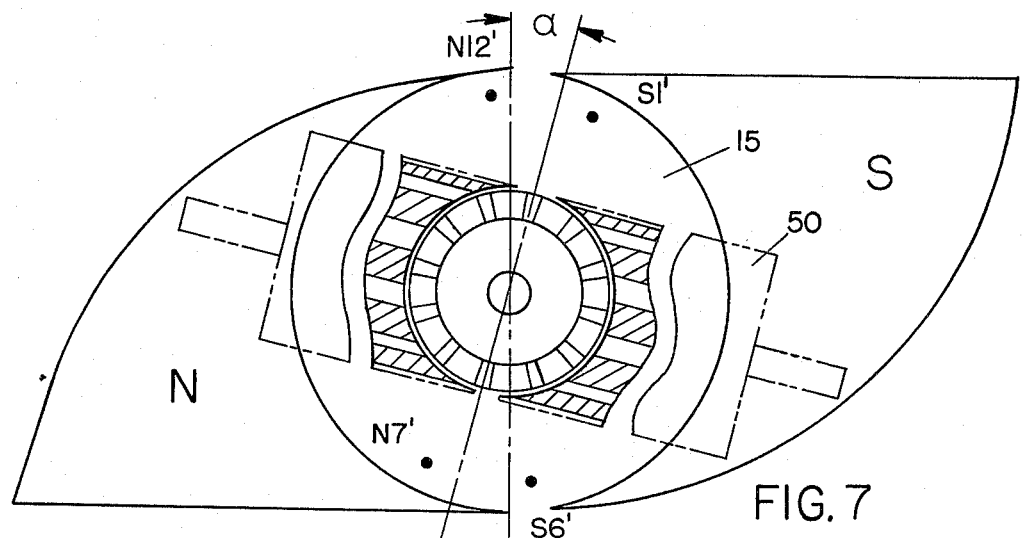
FIGS. 5-7 illustrate how commutator action maintains the angular orientation of the stator and rotor magnetic field gradients of the present invention.
Figure 6:
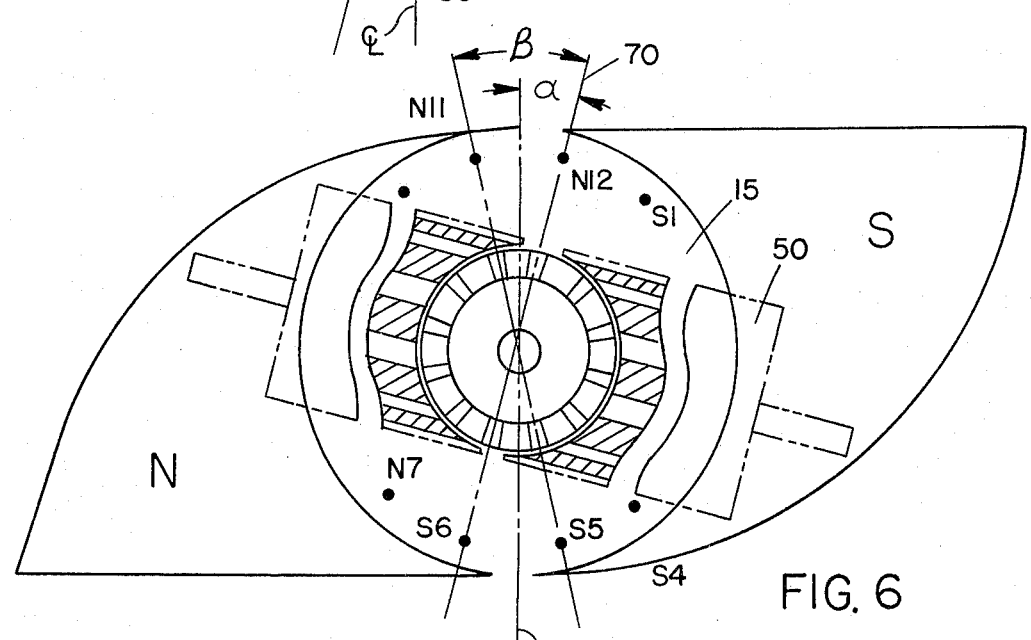
Figure 7A:
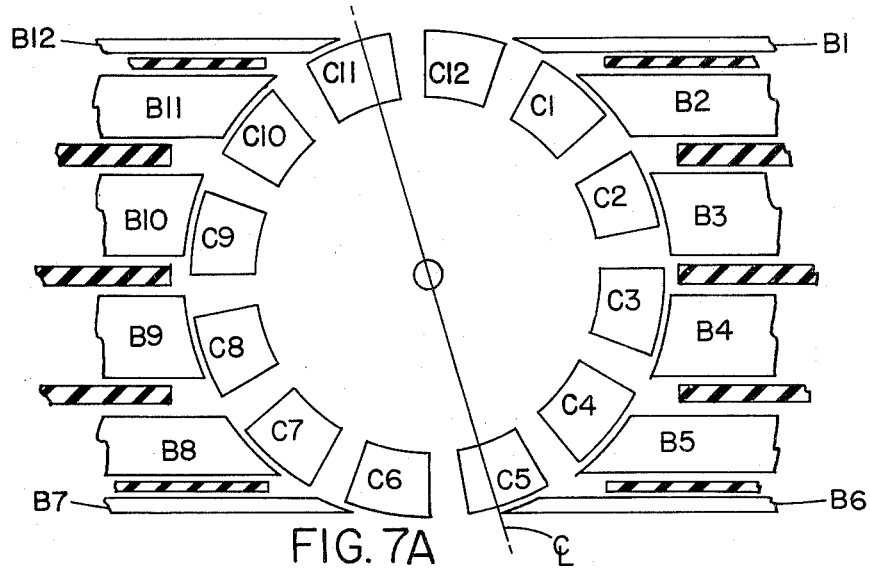

Referring now to FIGS. 7 and 7A, the rotor and commutator are illustrated as having rotated an amount just less than the angle $\beta$, or 30°. At this point, the commutator sections C1 through C12 again in electrical contact with one isolated brush. However, in this case commutator section C1 is now in contact with brush B2, C2 is now in contact with B3, C3 is now in contact with B4, etc. This produces a new set of strong and weak north and south pole seeking rotor sections now designated S1' through S6' and N7' through N12'. N12' corresponds to the old N11 and S1' corresponds to the old N12. N12' is now the strongest south pole seeking section of the rotor and S1' is now the weakest north pole seeking section of the rotor, etc. The strongest and weakest south and north pole seeking sections of the rotor are thus returned close to the same optimum orientations illustrated in FIG. 5 where the commutator cycle may again be repeated. In this manner, the strongest north and south pole seeking sections of the rotor are constantly maintained at their optimum positions with respect to the stator magnetic field gradient within an angle approximately equal to the angle $\beta$. Thus, an optimum disposition of the attracting and repelling forces established by tapered rotor and stator magnetic field gradients is constantly maintained. In motors having fewer or less than six rotor windings and twelve stator sections the operation would be the same only the angles $\beta$ and $\alpha$ would change. The angle $\beta$ is defined by the angular spacing of the poles or windings and the angle $\alpha$ is equal to half of the $\beta$.

Referring now back to FIG. 1, electrical connections to the brush assembly 17 and electromagnets 12 and 13 are illustrated. Alternating or direct current is inputted to the motor on brush terminals 80 and 81 by lines 82 and 83, respectively. Terminal 80 is then connected to electromagnet 13 by line 84, electromagnet 13 being appropriately wound to generate south pole stator section 11. The end of the coil of electromagnet 13 is then connected to the beginning of the coil of electromagnet 12 by line 85. The coil of electromagnet 12 is wound in appropriate manner to generate the north pole stator section 10. The end of the coil of electromagnet 12 is then connected to brush terminal 81 by line 86. As in all shunt wound and wired electrical motors, the motor of the present invention may be operated on either alternating or direct current, since in the case of an alternating current shunt wired motor, as the alternating current causes pole shifts on the rotor, simultaneous pole shifts will occur reversing north and south pole sections of the stator to ensure continued optimum placement of the attracting and repelling forces set up by cooperating tapered, magnetic field gradients.

Other forms, embodiments and applications of the invention may occur to those skilled in the art and it is intended by the appended claims to cover all such modifications as come within the proper scope of the invention.

The embodiments of the invention in which an exclusive property or privilege is claimed are defined as follows.

1. An electric motor comprising:
   a stator including north and south pole stator sections setting up a stator magnetic field gradient that tapers from strong to weak;
   a rotor including a plurality of windings having south and north pole seeking sections tapering from strong to weak, said windings setting up a rotor magnetic field gradient tapering from strong to weak;
   means for maintaining said rotor magnetic field gradient oriented such that the weakest north and south pole seeking sections of said windings are adjacent the strongest south and north pole sections of said stator magnetic field gradient, respectively, and the strongest south and north pole seeking sections of said windings are adjacent the weakest north and south pole sections of said stator magnetic field gradient, respectively.

2. The electric motor of claim 1 wherein:
   said north and south pole stator sections each define half of a cylindrical cavity for axially receiving said rotor; and
   said north and south pole stator sections each have axial cross sections defined by a minor segment of two overlapping circles of different diameters having one common tangent.

3. The electric motor of claim 1 wherein said north and south pole stator sections each have an axial cross section defined by:
   a first circle centered on the axis of the motor;
   a second circle having a radius approximately equal to the diameter of the first circle;
   said first and second circles intersecting at a common tangent to define the weakest of said north and south pole stator sections; and
   a tangent of said first circle spaced 180° from the common tangent and intersecting said second circle to define the strongest of said north and south pole stator sections.

4. The electric motor of claim 3 wherein the strongest north and south pole stator sections are on opposite sides of said stator.

5. The electric motor of claim 1 wherein said rotor includes:
   a plurality of opposing pairs of radially extending armature slots, said slots being disposed on opposite sides of said rotor;
   a commutator;
   a plurality of commutator segments one for each armature slot, commutator segments belonging to pairs of armature slots being disposed on opposite sides of said commutator;
   each of said paired armature slots being wound in a single direction by a conductor connecting the commutator of one member of said paired armature slots to the commutator of the other member of said paired armature slots.

6. The electric motor of claim 5 wherein said means for maintaining said stator magnetic field gradient comprises:
   a plurality of brushes one for each commutator segment; and
   a plurality of resistors one of said resistors being connected in series with each of said brushes,
   said resistors progressively varying in resistance value from high to low.

7. The electric motor of claim 5 wherein said means for maintaining said rotor magnetic field gradient comprises:
   a plurality of brushes one for each commutator segment; and
   a plurality of resistor pairs the members of each pair being equal in value and said resistor pairs being electrically connected in series with pairs of brushes in electrical contact with pairs of commutator segments on opposite sides of said rotor;
   said resistor pairs varying in resistance value from high to low and said resistor pairs being connected to brushes disposed about the periphery of said rotor such that in a 180° arc the resistance of said brushes progressively varies.

* * * * *